Oct. 14, 1969  H. C. SIMMONS ET AL  3,472,025
NOZZLE AND MANIFOLD ASSEMBLY
Filed Aug. 28, 1967  2 Sheets-Sheet 1
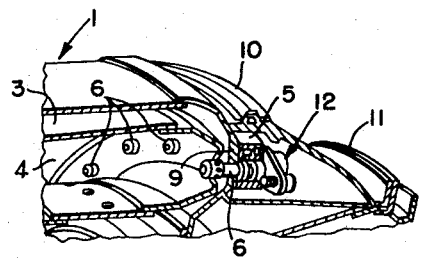
Fig. 1
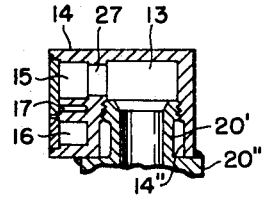
Fig. 12
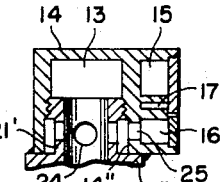
Fig. 13
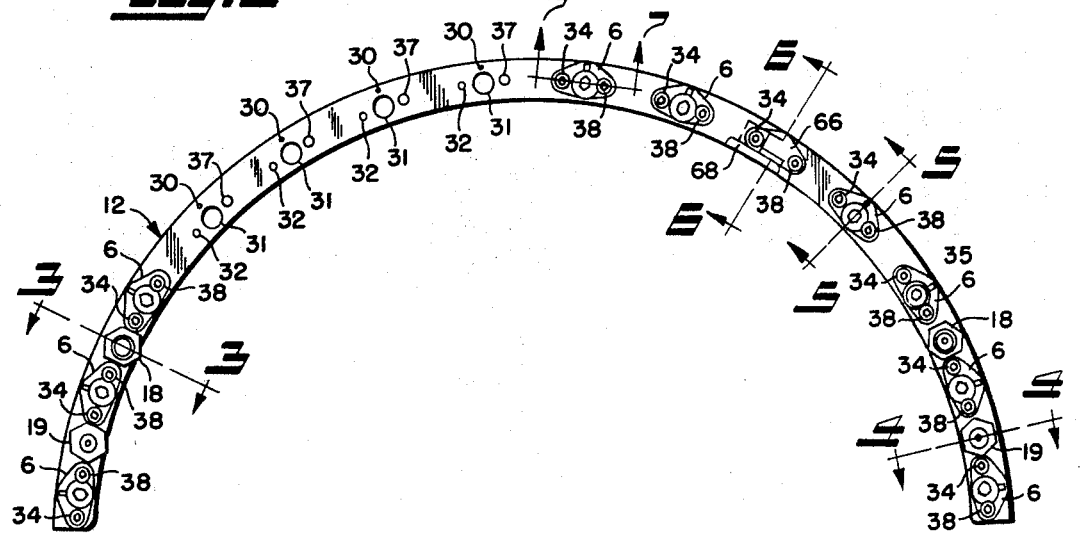
Fig. 2
Fig. 3
Fig. 4
Fig. 7
INVENTORS
HAROLD C. SIMMONS
DOMINIC J. LAPERA
BY
Oberlin, Maky, Donnelly & Renner
ATTORNEYS Oct. 14, 1969
H. C. SIMMONS ET AL
3,472,025
NOZZLE AND MANIFOLD ASSEMBLY
Filed Aug. 28, 1967
2 Sheets-Sheet 2
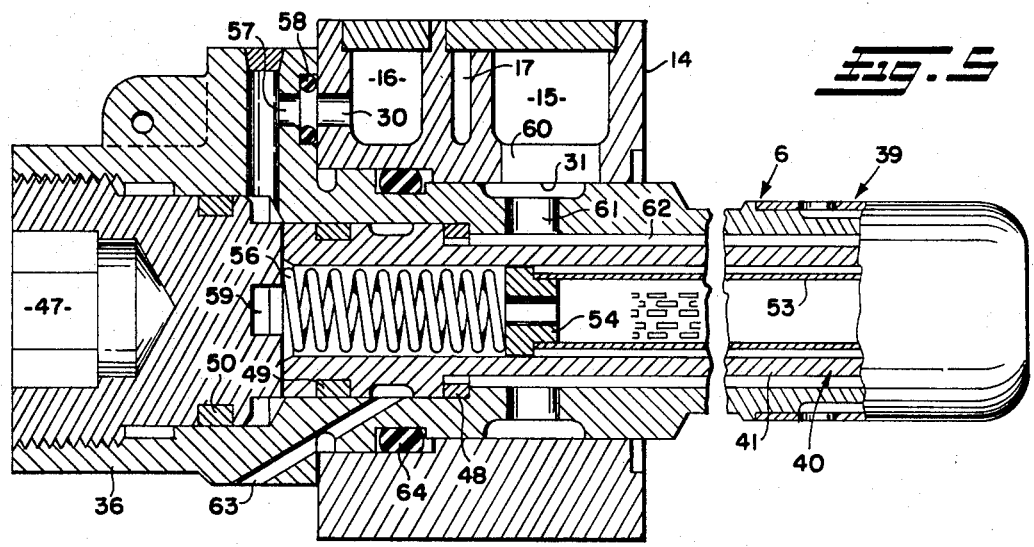
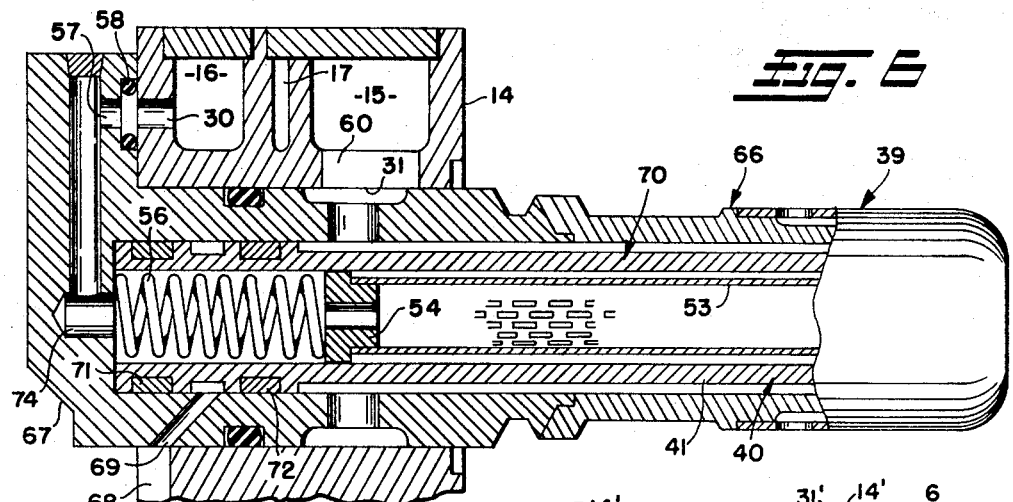
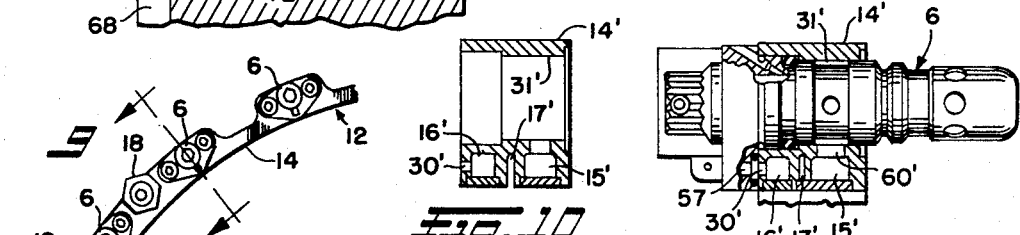
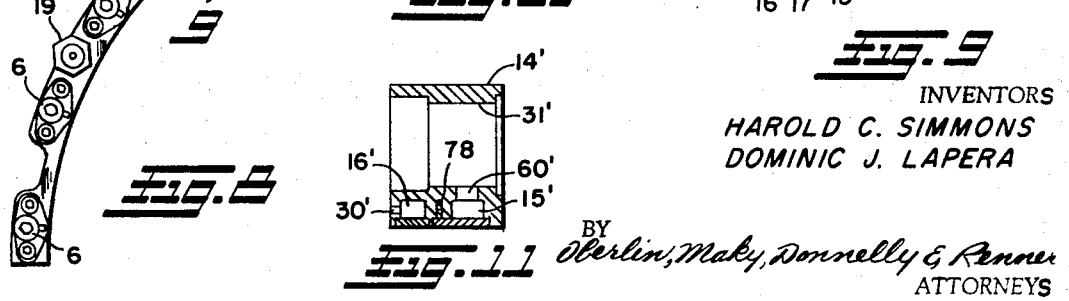
INVENTORS
HAROLD C. SIMMONS
DOMINIC J. LAPERA
BY Oberlin, Maky, Donnelly & Renner
ATTORNEYS United States Patent Office 3,472,025
Patented Oct. 14, 1969

3,472,025
NOZZLE AND MANIFOLD ASSEMBLY
Harold C. Simmons, Richmond Heights, and Dominic J. Lapera, Chadron, Ohio, assignors to Parker-Hannifin Corporation, Cleveland, Ohio, a corporation of Ohio
Filed Aug. 28, 1967, Ser. No. 663,867
Int. Cl. F02m 63/02; F23c 5/10; B05b 1/14
U.S. Cl. 60—39.74      12 Claims

ABSTRACT OF THE DISCLOSURE

Nozzle and manifold assembly for use in aircraft gas turbine engines and the like characterized in that a plurality of air assist fuel nozzles are detachably connected to a two channel manifold that supplies such air and fuel to the nozzles, the nozzles being insertible through the manifold to extend into the combustion chamber having air and fuel passages that make sealed connections with the air and fuel supply channels of the manifold.

BACKGROUND OF THE INVENTION

Heretofore, it has been a known practice for aircraft gas turbine applications to provide dual manifolds to direct primary and secondary fuel flow to fuel injection nozzles. In such manifolds the nozzles were attached to the combustion chamber side of the manifold and were inaccessible for removal without detaching the manifold.

SUMMARY OF THE INVENTION

Contrary to the foregoing, in the present invention a unitary dual manifold with fuel and air channels is connected to the engine adjacent the combustion chamber thereof, and the nozzles extend through the manifold from one side thereof into the combustion chamber and are connected to the manifold for individual withdrawal from the combustion chamber and from the manifold from said one side of the latter.

One object of this invention is to provide a nozzle and manifold assembly of the character indicated wherein the nozzles extend through openings in the manifold into the combustion chamber adjacent one side of the manifold and have flanges detachably clamped against the opposite side of the manifold.

Another object of this invention is to provide a simple form of unitary dual manifold assembly in which the air and fuel channels are insulated from each other as by means of an air chamber or air gap (with or without heat insulating material therein) between the air and fuel channels.

Another object of this invention is to provide a novel form of nozzle and manifold mounting which includes a first series of screws which secure the respective nozzle flanges to the rear side of the manifolds and a second series of screws which extend through the respective nozzle flanges and through the manifold and which secure the manifold to the engine, whereby upon removal of the first and second screws of a selected nozzle or nozzles, said selected nozzle or nozzles may be withdrawn rearwardly from the manifold while the manifold remains connected to the engine by the remaining ones of said second series of screws. Furthermore, if it be desired to remove the entire nozzle and manifold assembly from the engine, only the second series of screws need be removed whereby the first series of screws hold the nozzles in place on the manifold.

Another object of this invention is to provide a nozzle and manifold assembly in which the interior spray mechanism of a selected nozzle may be removed from the rear of the manifold while leaving its nozzle body intact on the manifold.

It is yet another object of this invention to provide a dual manifold and nozzle assembly of the character indicated wherein the nozzles are provided with drain ports downstream of the respective nozzle-manifold fuel seals to prevent fuel from getting into the air manifold or into the nozzle air passages in the event of leakage through any of the fuel seals.

It is another object to provide a two-channel manifold to which respective fuel and air inlet adaptors are assembled for connecting an air supply to one channel and a fuel supply to the other channel.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of invention, these being indicative, however, of a few of the various ways in which the principle of the invention may be employed.

BRIEF DESCRIPTION OF THE DRAWINGS

FIGURE 1 is a fragmentary perspective view of a gas turbine partly cut away to show the annular air duct, and the combustion chamber into which fuel spray nozzles or burners extend from a ring-type manifold mounted adjacent the rear end of the combustion chamber;

FIGURE 2 is a rear elevation view of one form of nozzle and manifold assembly embodying the present invention, the entire manifold in this case comprising two generally semicircular ring sections each having air inlets and fuel inlets adjacent the ends thereof;

FIGURE 3 is a cross-section view of an air inlet fitting taken substantially along the line 3—3, FIGURE 2;

FIGURE 4 is a cross-section view of the fuel inlet fitting taken substantially along the line 4—4, FIGURE 2;

FIGURE 5 is a cross-section view of one of the several identical nozzles taken substantially along the line 5—5, FIGURE 2;

FIGURE 6 is a cross-section view of a modified form of nozzle taken substantially along the line 6—6, FIGURE 2, said nozzle having been modified to clear, for example, an oil line or other obstruction of the gas turbine;

FIGURE 7 is a cross-section view taken substantially along the line 7—7, FIGURE 2 illustrating the manner of using short and long screws to secure each nozzle to the manifold and to secure the manifold to the engine;

FIGURE 8 is a fragmentary rear elevation view of another form of nozzle and manifold assembly;

FIGURE 9 is a cross-section view taken substantially along the line 9—9, FIGURE 8;

FIGURES 10 and 11 illustrate two other forms of thermalisolation of the fuel and air channels of the manifold from each other, FIGURE 10 showing an open air gap between the channels as distinguished from the closed gap shown in FIGURES 1 to 9, and FIGURE 11 showing a gap as in FIGURES 1 to 9 containing heat insulating material;

FIGURE 12 is a cross-section of a modified form of air inlet fitting; and

FIGURE 13 is a cross-section of a modified form of fuel inlet fitting.

DISCUSSION OF THE INVENTION

Referring to FIGURE 1, the portion of a gas turbine 1 therein illustrated includes an annular duct 3 through which air flows into a combustion chamber 4. Extending into the combustion chamber 4 from the two-part manifold 5 are a circular series of nozzles or burners 6 which spray fuel into the combustion chamber 4. From the combustion chamber 4 the burning gases flow through a turbine section, (not shown) in the well known manner.

Spaced from the rear end of the combustion chamber 4 is a bulkhead or end wall 9 of the annular air duct 3 which has threaded openings therein for receiving manifold mounting screws in a manner presently to be explained in detail. Detachably mounted to the bulkhead 9 as by a split band clamp 10 as shown, is a housing assembly 11 which, when the clamp 10 is opened, may be axially retracted to provide access to the manifold and nozzle assemblies 12.

Referring now to FIGURES 2 to 7, each manifold and nozzle assembly 12 comprises a generally semicircular ring or manifold 14 which has coaxial air and fuel channels 15 and 16 around its outer periphery with an air gap 17 therebetween. Adjacent each end of the manifold 14 are air and fuel fittings 18 and 19 which are screw connected to air and fuel adapters 20 and 21 welded to the manifold 14. Adapters 20, 21 have tubular portions 20', 21' whose inner ends are enlarged and engage the walls of the manifold recesses 13 into which they fit so as to center the adapters relative to the recesses. The manifold recesses 13 are counterbored as at 14" to provide annular chambers surrounding tubular portions 20', 21'. In the case of the fuel fitting 19, the incoming fuel flows through a screen 23 in the adapter 21, through openings 24, and through an opening 25 leading into the fuel channel 16. The air adapter 20, likewise, has a screen 26 therein and the incoming air from air fitting 18 flows through the adapter 20 and thence through the opening 27 which leads into the air channel 15.

The rear side of the manifold 14 is formed with circumferentially spaced fuel outlet openings 30 leading into the fuel channel 16. Radially inward of each fuel outlet opening 30 is a counterbored opening 31 axially through the manifold 14 to receive therein a nozzle 6. Adjacent one side of each counterbored opening 31 is a threaded opening 32 for a short screw 34 which extends through the flange 35 of the nozzle body 36 and on the other side of each counterbored opening 31 is an opening 37 through the manifold 14 for a long screw 38 which extends through the flange 35 and has threaded engagement with the engine bulkhead 9 as best shown in FIGURE 7.

Referring now to FIGURE 5, each nozzle 6 (except that shown in FIGURE 6) comprises a nozzle body 36 clamped by the screws 34 and 38 aforesaid to the manifold 14 to exend through the counterbored opening 31, said body having a shroud 39 at its front end which extends into the combustion chamber 4. Removably fitted within the nozzle body 36 is the nozzle tip assembly 40 comprising a liner 41 terminating in a central fuel discharge orifice (not shown) adjacent the end of shroud 39. The nozzle 6 herein is of the air assist type and is provided with an air discharge orifice around the fuel discharge orifice. The nozzle tip assembly 40 is clamped in place by means of the screw plug 47, there being a copper or like gasket 48 between the liner 41 and the body 36. Suitable packing rings 49 and 50 as of fluorosilicone are installed in the liner 41 and plug 47 grooves to prevent fuel leakage. Within the nozzle tip assembly 40 is a fuel filter 53 and a filter support 54, said plug assembly being retained in the position shown in FIGURE 5 by means of the spring 56 which is compressed between the end of the screw plug 47 and the filter support 54.

The side of each nozzle body 36 which is against the rear face of the manifold 14 is formed with a counterbored fuel passage 57 which registers with the respective fuel outlet 30 from the fuel channel 16 and the joint thereat is sealed by a suitable packing ring 58 as of fluorosilicone. The screw plug 47 has a slot 59 diametrically across its inner reduced diameter end whereby fuel may flow from passage 57 through slot 59, spring 56, filter support 54, and filter 53 to the fuel discharge orifice at the end of the liner 41. The fuel will, as well known in the art be discharged in the form of a thin conical sheet.

At each nozzle location, the air channel 15 has a radial opening 60 registering with a peripheral groove in the nozzle body 36 whereby air from the air channel 15 will flow through each radial opening 60, openings 61 in the grooved portion of the nozzle body 36, and annular passage 62 between the nozzle body 36 and the liner 41 to the air discharge orifice adjacent the end of the liner 41.

The nozzle 6 herein illustrated is, as aforesaid, preferably of the air assist type wherein an air stream around the fuel spray assists in breaking up the fuel sheet issuing from the fuel discharge orifice. Accordingly, for the purposes of the present application, it has not been deemed necessary to illustrate or describe in detail the internal mechanism of the nozzle tip assembly 40. However, it should be noted that such air assist nozzle 6 may utilize low pressure air of from say, ½ to 10 p.s.i., but yet, said nozzle 6 may have a very wide useful fuel flow range of, for example, 100:1 as compared with the usual 4:1 range obtainable with liquid pressure operated nozzles.

Because the fuel pressure is normally considerably greater than the aforesaid air pressure it is desirable to provide a drain port 63 or vent downstream of the packing ring 49 which seals the nozzle tip assembly 40-nozzle body 36 joint so that in the event that said packing 49 leaks, the fuel will drain through the drain port 63 without getting into the air channel 15 or into the air passages of nozzle 6. Furthermore, in the absence of fuel pressure or a fuel pressure less than the air pressure, then air in the air channel 15 or air passages if it leaks past the copper gasket 48 or past the nozzle body-manifold packing 64 will likewise flow through the drain port 63 and will not thereby get into the fuel system.

From the foregoing description of the nozzle 6, it can be seen that by removing both the short and long screws 34 and 38 the entire nozzle 6 may be pulled rearwardly out of the manifold 14 while the manifold 14 is yet clamped in place by the other remaining long screws 38 which are threaded into the bulkhead 9. Moreover, if it be desired merely to replace or service a nozzle tip assembly 40 only the screw plug 47 need be removed from the nozzle 6, whereupon the nozzle tip assembly 40 may be completely pulled out of the nozzle body 36 without disturbing the connection of the body 36 to the manifold 14.

Referring now to FIGURE 6, the nozzle 66 is essentially the same as the nozzle 6 illustrated in FIGURE 5, except that the nozzle body 67 has been shortened to clear an oil line or other obstruction not shown. Also the manifold 14 has a cutout portion 68 to accommodate the drain port 69. Because the screw plug 47 is not employed in nozzle 66, the entire nozzle 66 may be withdrawn rearwardly from the manifold 14 when the obstruction is removed but it is not possible to pull out the nozzle tip assembly 70 separately, as in the case of the nozzle tip assembly 40 of FIGURE 5. In FIGURE 6, the nozzle tip assembly 70 is sealed in the adapter by two packing rings 71 and 72 which straddle the drain port 69 in nozzle body 67, and the fuel passage 57 leads directly to a central bore 74 in the bottom of the body 67. As in connection with FIGURE 5, the drain port 69 in FIGURE 6 between the packings 71 and 72 vents fuel or air leakage so that fuel will not enter the air system or so that air cannot enter the fuel system in the event that the fuel system pressure is lower than the air pressure.

Referring now to FIGURES 8 and 9, the nozzle and manifold assembly 12' shown therein is similar to that shown in FIGURES 1 to 7 except that the air and fuel channels 15' and 16' are formed on the inner periphery of the manifold 14'. The nozzles 6 used in FIGURE 8 are the same as that shown in FIGURE 5 except that they are turned around so that the fuel passages 57 register with the fuel outlets 30' leading to the fuel channel 16'. Otherwise, the structure of FIGURES 8 and 9 is similar to that of FIGURES 1 to 7, in that the air and fuel channels 15' and 16' are coaxial and have an air gap or channel 17 therebetween.

With reference to the air gaps 17 or 17', it is apparent that they may contain insulating material 78 as shown in FIGURE 11, or said air gap 17 or 17' may be left open as in FIGURE 10 for air circulation therethrough for improved insulating characteristics to minimize interchange of heat between the air and fuel channels 15 and 16 or 15' and 16'.

FIGURES 12 and 13 show modified forms of air and fuel inlet adapters 20", 21" that are the same as those in FIGURES 3 and 4 except that the inner ends of tubular portions 20', 21' are threadedly engaged with threads in recesses 13 for both securing and centering the adapters relative to the manifold recesses 13. The adapters 20", 21" are also welded to the manifold to seal the recesses 13.

Other modes of applying the principle of the invention may be employed, change being made as regards the details described, provided the features stated in any of the following claims, or the equivalent of such, be employed.

We therefore particularly point out and distinctly claim as our invention:

1. A manifold and nozzle assembly for a gas turbine or the like comprising a manifold having air and fuel channels therein and a nozzle receiving passage therethrough; an elongated nozzle extending through said passage to project from one side of said manifold into the combustion chamber of the gas turbine and having air and fuel passages communicating with the respective air and fuel channels; and means detachably securing said nozzle to said manifold for withdrawal from the combustion chamber and from the nozzle receiving passage.

2. A manifold and nozzle assembly comprising a manifold having first and second fluid receiving channels therein and having a nozzle receiving passage therethrough, a nozzle comprising a body and an insert, the body being received in said passage and having a bore in which the insert is received, said nozzle having an exit orifice and having first and second fluid conducting passages respectively connected to the first and second channels and leading to the orifice, a first pair of spaced packings between the insert and body sealing the first passage from the second passage, a second pair of spaced packings between the body and manifold sealing the first passage from the second passage, and drain port means venting the space between each pair of packings to prevent leakage fluid from either channel to mix with fluid from the other channel.

3. The assembly of claim 2 in which one of said second pair of packings is within said nozzle receiving passage and the other is between a flat end face of the manifold and an opposed face of the body.

4. A nozzle and manifold assembly comprising a curved manifold having one side adapted to be secured to a gas turbine and the like adjacent the combustion chamber thereof; said manifold having a fuel inlet port leading to a curved fuel channel therein which has a plurality of circumferentially spaced fuel outlet openings, and nozzle receiving passages extending through said manifold adjacent the respective fuel outlets; nozzles secured to said manifold to extend through the respective passages into such combustion chamber; said nozzles having fuel passages therein communicating with the respective fuel outlets and terminating in discharge orifices whereby fuel under pressure in said channel is discharged through said nozzles into said combustion chamber; and means mounting said nozzles on said manifold for withdrawal from the respective nozzle receiving passages from the other side of said manifold in a direction away from the combuston chamber, thus providing for external removal of said nozzles while said manifold is secured to such gas turbine.

5. The assembly of claim 4 wherein said means for mounting said nozzles on said manifold comprises first screw means for securing the respective nozzles to said manifold, and second screw means for securing the respective nozzles and said manifold to such gas turbine; characterized in that removal of said first and second screw means of any selected nozzle or nozzles enables removal of the latter without disturbing the connections of the remaining nozzles to said manifold and of said manifold to such gas turbine.

6. A nozzle and manifold assembly comprising a curved manifold adapted to be secured to a gas turbine and the like adjacent the combustion chamber thereof; said manifold having fuel and air inlet ports leading to respective curved fuel and air channels therein, a plurality of circumferentially spaced fuel outlets and air outlets respectively communicating with said fuel and air channels, nozzle-receiving passages extending through said manifold and intersecting the respective air outlets; and nozzles secured to said manifold to extend through the respective nozzle receiving passages into such combustion chamber; said nozzles having fuel and air passages terminating in fuel and air discharge orifices communicating with the respective fuel and air outlets whereby fuel under pressure in said fuel channel is sprayed through said nozzles into said combustion chamber while the air discharged through said nozzles into said combustion chamber assists in further breaking up the fuel; and means mounting said nozzles on said manifold for withdrawal from the respective nozzle-receiving passages in a direction away from such combustion chamber, thus providing for external removal of said nozzles while said manifold is secured to such gas turbine.

7. The assembly of claim 6 wherein said fuel and air channels are disposed adjacent each other and there is another channel between said fuel and air channels which provides an insulating medium therebetween.

8. A nozzle and manifold assembly comprising a curved manifold adapted to be secured to a gas turbine and the like adjacent the combustion chamber thereof; a plurality of nozzles secured to said manifold in circumferentially spaced apart relation; said manifold and nozzles having registering fuel passages for flow of fuel into and through said manifold for discharge from the respective nozzles into such combustion chamber; means mounting said nozzles for independent removal from said manifold in a direction away from such combustion chamber and said manifold; at least some of said nozzles having spray tip assemblies in the nozzle bodies thereof; and means mounting said spray tip assemblies for removal from the respective bodies without disturbing the connections of said nozzle bodies to said manifold and said manifold to said such gas turbine.

9. The assembly of claim 1 wherein said nozzle includes a part radially overlying a portion of the other side of said manifold, said part and said portion having connecting passages that communicate respectively with the nozzle fuel passage and the fuel channel; and a sealing ring is housed between said part and portion and surrounds the passages in said part and portion to seal the same.

10. The assembly of claim 1 wherein said manifold has first and second recesses therein adjacent said channels which open to an exterior face of said manifold, a first inlet adapter attached to said manifold and having a first tubular portion extending into the first open recess, a first passage connecting one of said channels with the interior of the first tubular portion, a second inlet adapter attached to the manifold and having a second tubular portion extending into the second open recess, and a second passage connecting the other channel with the interior of the second tubular portion, said first passage including an opening through the wall of the first tubular portion intermediate the ends of the latter.

11. The assembly of claim 10 in which said first recess includes a bore and a counterbore, said first tubular portion extends through the counterbore and into the bore and has a close fit with the latter for centering the tubular portion within the first recess.

12. The assembly of claim 10 in which said first passage includes an annular space formed between the first tubular portion and the opposed wall of the first recess.

References Cited

UNITED STATES PATENTS

| | | | |
|---|---|---|---|
| 2,422,214 | 6/1947 | Meyer et al. | 60—39.74 |
| 2,944,388 | 7/1960 | Bayer | 60—261 X |
| 2,946,185 | 7/1960 | Bayer | 60—39.74 X |
| 2,993,338 | 7/1961 | Wilsted | 60—39.74 |
| 3,132,482 | 5/1964 | Benedict | 60—39.74 X |
| 3,139,138 | 6/1964 | Bloom | 431—177 |

CARLTON R. CROYLE, Primary Examiner

D. HART, Assistant Examiner

U.S. Cl. X.R.

239—550; 431—178